(12) United States Patent
Bastian, II et al.

(10) Patent No.: US 11,537,119 B2
(45) Date of Patent: Dec. 27, 2022

(54) VOICE CONTROLLED MATERIAL HANDLING MOBILE ROBOTIC SYSTEM

(71) Applicant: Bastian Solutions, LLC, Indianapolis, IN (US)

(72) Inventors: William A. Bastian, II, Carmel, IN (US); Mitchel H Szazynski, Indianapolis, IN (US)

(73) Assignee: Bastian Solutions, LLC, Indianapolis, IN (US)

( * ) Notice: Subject to any disclaimer, the term of this patent is extended or adjusted under 35 U.S.C. 154(b) by 216 days.

(21) Appl. No.: 15/929,257

(22) Filed: Apr. 9, 2020

(65) Prior Publication Data
US 2020/0326699 A1      Oct. 15, 2020

Related U.S. Application Data

(60) Provisional application No. 62/832,565, filed on Apr. 11, 2019.

(51) Int. Cl.
*G05D 1/00* (2006.01)
*B66F 9/06* (2006.01)
(Continued)

(52) U.S. Cl.
CPC .......... *G05D 1/0016* (2013.01); *B66F 9/063* (2013.01); *G05D 1/0088* (2013.01); *G10L 15/22* (2013.01);
(Continued)

(58) Field of Classification Search
CPC .. G05D 1/0016; G05D 1/0033; G05D 1/0214; G05D 2201/0216; G05D 1/0088;
(Continued)

(56) References Cited

U.S. PATENT DOCUMENTS

| 5,610,815 A | 3/1997 | Gudat et al. |
| 5,859,517 A | 1/1999 | DePasqua |

(Continued)

FOREIGN PATENT DOCUMENTS

| CN | 105259898 A | 1/2016 |
| CN | 105446162 A | 3/2016 |

(Continued)

OTHER PUBLICATIONS

Teller et al.; A Voice-Commandable Robotic Forklift Working Alongside Humans in Minimally-Prepared Outdoor Environments; 2010 IEEE Intl. Conf. on Robotics and Automation; May 3-8, 2010; Anchorage, Alaska; pp. 526-533 (Year: 2010).*

*Primary Examiner* — Michael J Zanelli
(74) *Attorney, Agent, or Firm* — Woodard, Emhardt, Henry, Reeves & Wagner, LLP

(57) ABSTRACT

An AMU system includes an Autonomous Mobile Unit ("AMU"), base station, lanyard, and Warehouse Management System ("WMS") configured to communicate with one another over a network. The AMU includes a microphone configured to receive verbal commands from an individual. The individual can further provide verbal commands through the base station and the lanyard when worn by the individual. The lanyard can also provide a geo-fence around the individual where the AMU slows down to enhance safety.

22 Claims, 9 Drawing Sheets

(51) Int. Cl.
*G10L 15/22* (2006.01)
*B65G 1/137* (2006.01)

(52) U.S. Cl.
CPC ..... *B65G 1/137* (2013.01); *G05D 2201/0216* (2013.01); *G10L 2015/223* (2013.01)

(58) Field of Classification Search
CPC ...... B66F 9/063; B66F 17/003; B66F 9/0755; B66F 9/24; G10L 15/22; G10L 2015/223; B65G 1/137
See application file for complete search history.

(56) References Cited

U.S. PATENT DOCUMENTS

| | | |
|---|---|---|
| 6,481,525 B1 | 11/2002 | Bloch et al. |
| 6,548,982 B1 | 4/2003 | Papanikolopoulos et al. |
| 6,681,638 B2 | 1/2004 | Kazerooni et al. |
| 7,017,689 B2 | 3/2006 | Gilliland et al. |
| 8,072,309 B2 | 12/2011 | Kraimer et al. |
| 8,193,903 B2 | 6/2012 | Kraimer et al. |
| 8,970,363 B2 | 3/2015 | Kraimer et al. |
| 9,059,777 B2 | 6/2015 | Shattuck et al. |
| 9,082,293 B2 | 7/2015 | Wellman et al. |
| 9,122,276 B2 | 9/2015 | Kraimer et al. |
| 9,207,673 B2 | 12/2015 | Pulskamp et al. |
| 9,649,766 B2 | 5/2017 | Stubbs et al. |
| 9,713,871 B2 | 7/2017 | Hill et al. |
| 2002/0138936 A1 | 10/2002 | Takeuchi et al. |
| 2004/0180631 A1* | 9/2004 | Lim ........................ H04M 1/05 455/90.3 |
| 2011/0295399 A1 | 12/2011 | Plociennik et al. |
| 2018/0164818 A1* | 6/2018 | Wilkinson ............ G01S 5/0027 |
| 2018/0354140 A1 | 12/2018 | Watanabe |
| 2019/0137991 A1* | 5/2019 | Agarwal ............... B66F 9/0755 |

FOREIGN PATENT DOCUMENTS

| | | |
|---|---|---|
| CN | 106950951 B | 7/2017 |
| JP | 2004-268151 A | 9/2004 |
| WO | 2009/155948 A1 | 12/2009 |

* cited by examiner

VOICE CONTROLLED MATERIAL HANDLING MOBILE ROBOTIC SYSTEM

CROSS REFERENCE TO RELATED APPLICATIONS

This application claims the benefit of U.S. Provisional Patent Application No. 62/832,565, filed on Apr. 11, 2019, which is hereby incorporated by reference.

BACKGROUND

With automation becoming more routine in industry, safety and operational flexibility are becoming more of a concern. In the past, human access to robots and Autonomous Guided Vehicles (AGVs) was severely limited out of safety concerns. Newer sensor, computer, and software technology has improved to such an extent that autonomous robotic systems and humans can now regularly work in closer proximity to one another. With these improvements, comes an ever-growing market demand for more flexible, scalable, and user-friendly methods of controlling and obtaining information from these systems.

Thus, there is a need for improvement in this field.

SUMMARY

This system generally concerns a unique voice controlled Autonomous Mobile Unit (AMU), such as an AGV, mobile robot, and/or automated forklift. The system is designed to enhance safety and control based on voice command and geo-fencing information provided by a lanyard worn by an individual.

In one particular example, the AMU has a voice detection system that includes a microphone as well as an onboard circuit board that is able to process both a wake word and any safety or emergency words locally without having to send for translation over a network so as to reduce latency. For instance, when the AMU is close to an individual, the individual can say the word "stop", and the AMU will stop. In another variation, commands can be used to give instructions to the AMU, provide information to the individual, and/or perform any number of safety operations such as stopping and turning. An individual can also provide commands to interrupt the workflow of the AMU such that the AMU will interrupt the current workflow and perform the command requested verbally by the individual, and once the command is satisfied, the AMU can resume its previous workflow. The system can further include base stations that have microphones for receiving voice commands. Moreover, individuals can wear lanyards through which the individuals can communicate with the voice control system and control a particular AMU. For example, a supervisor can issue commands to retrieve information and/or determine a given state of a particular device controlled by the system. The lanyard further can include tags that are used to locate individuals within a facility such as a warehouse, storage lot, or manufacturing plant. In one particular example, the AMU slows down automatically in the vicinity of an individual wearing such a lanyard without even issuing a voice command.

Aspect 1 generally concerns a system that includes a autonomous mobile unit (AMU) that is responsive to voice commands.

Aspect 2 generally concerns the system of any previous aspect in which the voice commands include safety control commands.

Aspect 3 generally concerns the system of any previous aspect in which the safety control commands are configured to stop the AMU.

Aspect 4 generally concerns the system of any previous aspect in which the AMU has a controller to process the voice commands locally to reduce latency.

Aspect 5 generally concerns the system of any previous aspect in which the AMU is configured to transmit non-safety related control commands for remote processing.

Aspect 6 generally concerns the system of any previous aspect in which the controller includes a circuit board integrated with a microphone.

Aspect 7 generally concerns the system of any previous aspect in which the voice commands include requests for information.

Aspect 8 generally concerns the system of any previous aspect in which the voice commands include system control commands for controlling functions of the AMU.

Aspect 9 generally concerns the system of any previous aspect in which the system control commands control movement of the AMU.

Aspect 10 generally concerns the system of any previous aspect in which the AMU includes microphones for receiving the voice commands.

Aspect 11 generally concerns the system of any previous aspect in which the AMU includes an Automated Guided Vehicle (AGV).

Aspect 12 generally concerns the system of any previous aspect in which the AMU is controlled by a base station with a microphone for receiving the voice commands.

Aspect 13 generally concerns the system of any previous aspect in which the AMU is controlled by a human-worn lanyard with a microphone for receiving the voice commands.

Aspect 14 generally concerns the system of any previous aspect in which the lanyard includes a tracking device for location tracking.

Aspect 15 generally concerns the system of any previous aspect in which the AMU is configured to perform a safety action in the presence of the lanyard.

Aspect 16 generally concerns the system of any previous aspect in which the voice commands are configured to temporarily interrupt workflow of the AMU to perform a different task.

Aspect 17 generally concerns a method of operating the system of any previous aspect.

Further forms, objects, features, aspects, benefits, advantages, and embodiments of the present invention will become apparent from a detailed description and drawings provided herewith.

DETAILED DESCRIPTION OF SELECTED EMBODIMENTS

Figure 1:
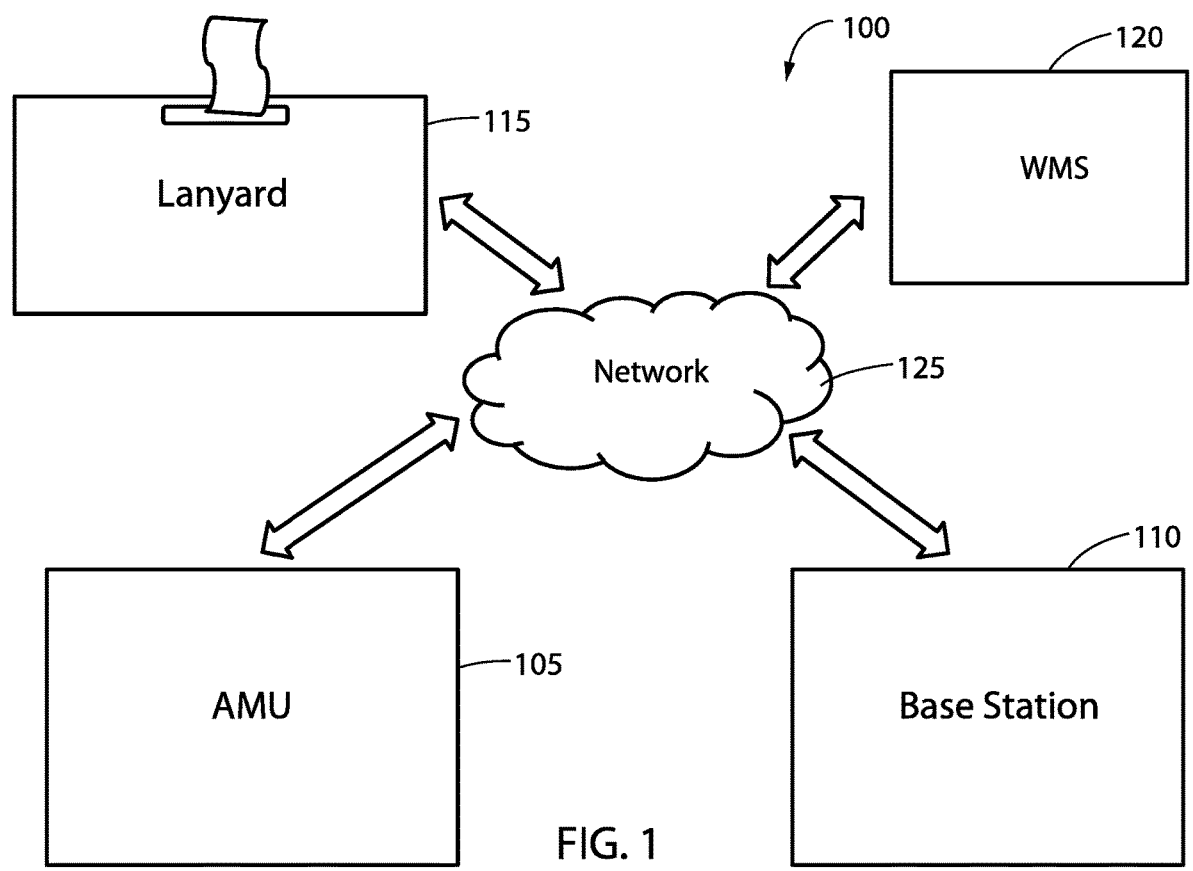
FIG. 1 is a diagrammatic view of an Autonomous Mobile Unit System ("AMU system").

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein, are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

The reference numerals in the following description have been organized to aid the reader in quickly identifying the drawings where various components are first shown. In particular, the drawing in which an element first appears is typically indicated by the left-most digit(s) in the corresponding reference number. For example, an element identified by a "100" series reference numeral will likely first appear in FIG. 1, an element identified by a "200" series reference numeral will likely first appear in FIG. 2, and so on.

Figure 2:
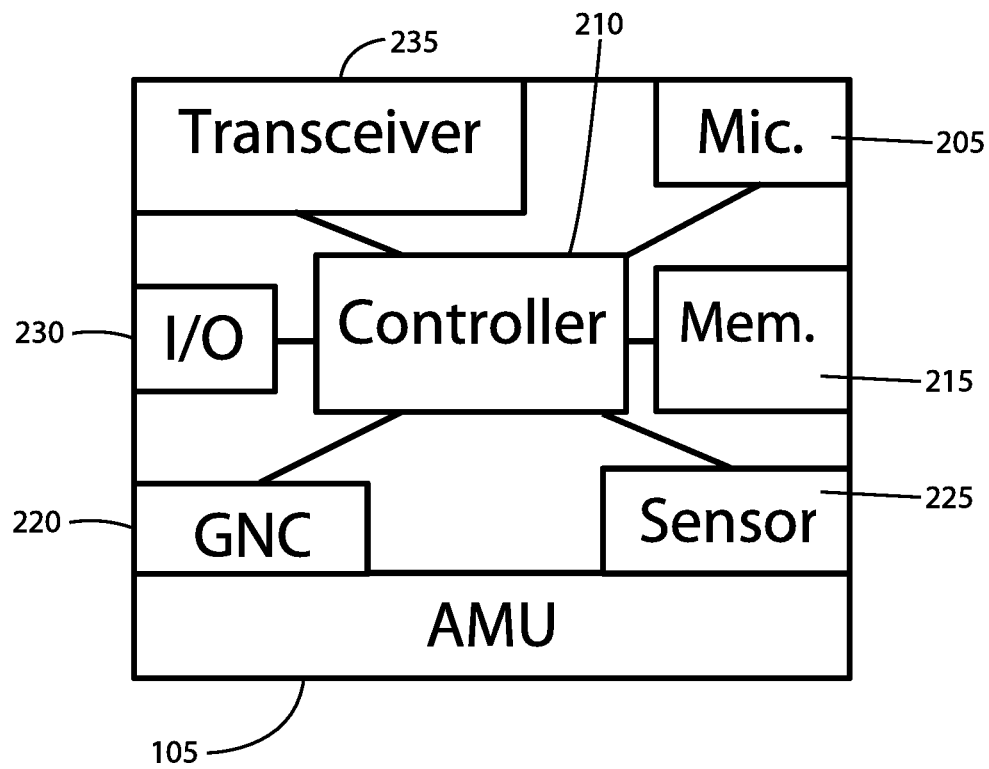
FIG. 2 is a diagrammatic view of an AMU found in the FIG. 1 AMU system.

FIG. 1 shows a diagrammatic view of an Autonomous Mobile Unit System ("AMU system") 100 according to one example. As shown, the AMU system 100 includes at least one Autonomous Mobile Unit ("AMU") 105, at least one base station 110, at least one lanyard 115, and at least one WMS 120. The AMU 105, base station 110, lanyard 115, and WMS 120 communicate over a network 125. The network 125 can for example include a wireless and/or wired computer type network as well as private and/or public type networks. In the illustrated example, the network 125 includes a wireless network, and the AMU 105, base station 110, lanyard 115, and WMS 120 communicate wirelessly.

The AMU 105 is configured to automatically or semi-automatically handle and move items, such as pallets, boxes, bags, parts, and other objects, within a storage facility like a warehouse or manufacturing plant. In one example, the AMU 105 includes an autonomous or semi-autonomously driven forklift truck. In another example, the AMU 105 includes an Automated Guided Vehicle (AGV). Looking at FIG. 2, the AMU 105 includes at least one microphone 205 that is used to voice control the AMU 105 such as for safety and material handling purposes. The microphone 205 is operatively coupled to a controller 210 that at least partially processes voice commands from the microphone 205 and controls the operation of the AMU 105. The controller 210 has memory 215 configured to store information.

As will be explained in greater detail below, the controller 210 is configured to determine whether words spoken by a human to the AMU 105 via microphone 205 are related to safety issues or not. If the one or more words (or phrases) concern safety or other urgent issues, such as "stop" or "halt", based on data and speech recognition models stored in memory 215, the controller 210 will automatically decode or determine the command locally on the AMU 105 and automatically perform the requisite action (e.g., stop) without communicating with the WMS 120. On the other hand, if the voice command is not safety related or urgent, the controller 210 via the transceiver 235 transmits the sound file/data as well as other data to the WMS 120 for processing. Once the voice command is processed by the WMS 120, the WMS 120 transmits the resulting instructions and/or data back to the transceiver 235 of the AMU 105.

By processing these types of safety related or urgent verbal commands locally, any lag time or latency is reduced which can be crucial to safety. In addition, the AMU 105 is able to safely operate even if the WMS 120 and/or network 125 are down or unavailable. For instance, parts of warehouses or manufacturing plants can experience excessive radio interference which inhibits communication with the network 125. Even under such conditions, the AMU 105 is able to provide additional safety capabilities because the voice commands are processed locally on the AMU 105. The controller 210 in the illustrated example is depicted as a unitary component, but in other examples, the controller 210 can be formed by multiple remotely located components that communicate with one another. For instance, part of the controller 210 can include a computer, and the voice processing of the sounds from the microphone 205 can be performed on a separate dedicated voice recognition circuit board located proximal to the microphone 205. In this instance, the circuit board of the controller 210 can use Automatic Speech Recognition software ("ASR software") such as those using Hidden Markov Models (HMM), Dynamic Time Warping based approaches, and/or neural networks such as deep feed forward and recurrent neural networks.

The controller 210 is further operatively coupled to a Guidance, Navigation, and Control system ("GNC system") 220 that is configured to automatically sense the position, velocity, and/or acceleration of the AMU 105 so as to direct and control movement of the AMU 105. The AMU 105 further includes one or more sensors 225 for sensing conditions (e.g., location, objects, temperature, etc.). The sensors 225 in one example include location sensors (e.g., GPS) and a vision system, but the AMU 105 can include other types of sensors 225. To interact with individuals, the AMU 105 has at least one I/O device 230 that is operatively coupled to the controller 210. For instance, the I/O device 230 can include a display, one or more indicator lights, a speaker, a steering wheel, levers, switches, and a touch screen to just name a few examples. In order to communicate over the network 125, the AMU 105 further has a transceiver 235 which is operatively coupled to the controller 210. It should be recognized that the AMU 105 further can include other components commonly found on AMUs 105 such as support frames, forks, robot arms, power sources, wheels, and motors, to just name a few examples.

The base station 110 provides another way for an individual to control the AMU 105 via voice commands and/or receive information from the AMU 105 and/or the WMS 120. Typically, but not always, the base station 110 is located at a generally fixed location within a facility such as for example near a loading dock in a warehouse. An operator or other individual can verbally control one or more AMUs 105 via the base station 110. Through the base station 110, the operator can further provide and/or receive information about the AMU 105, base station 110, and WMS 120 as well as other information. For instance, an individual can view stock levels of particular items within an inventory, or the location and operational readiness of a particular AMU 105 in the facility.

Figure 3:
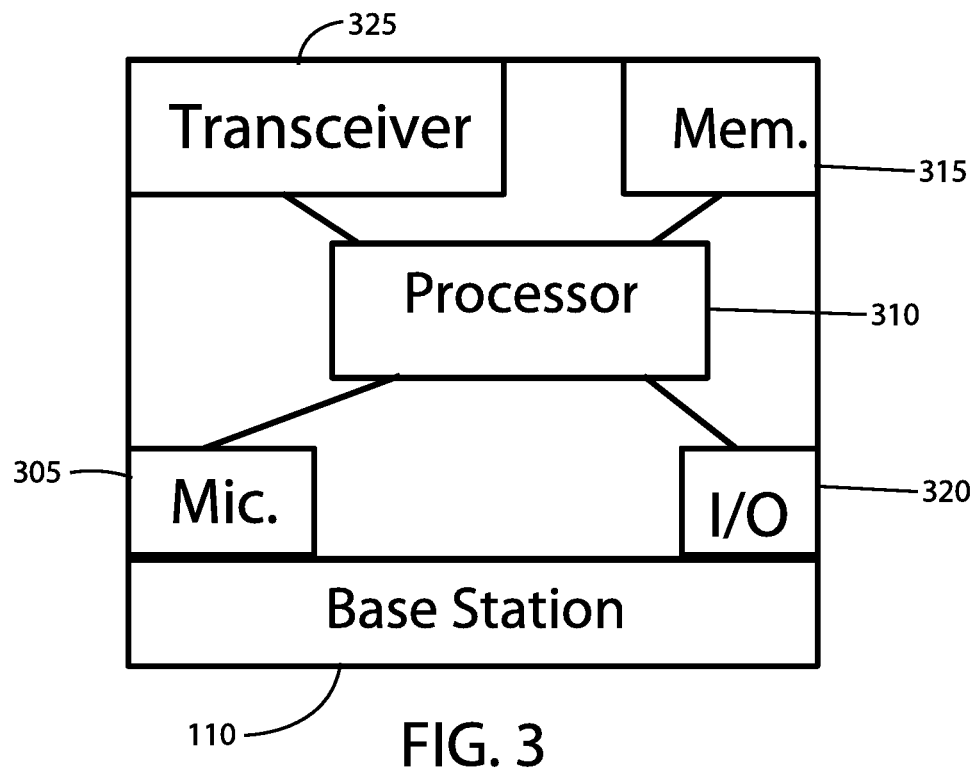
FIG. 3 is a diagrammatic view of a base station found in the FIG. 1 AMU system.

Referring to FIG. 3, the base station 110 includes a microphone 305 configured to receive verbal or other auditory commands from the operator. The microphone 305 is operatively coupled to a processor 310 that processes commands and/or data for the base station 110. The base station 110 further includes memory 315 to store and retrieve information that is communicated to the processor 310.

In the illustrated example, the processor 310 is further operatively coupled to an I/O device 320 that receives input from and provides information to the operator. In one example, the I/O device 320 includes a touch display, keyboard, and speaker, but the I/O device 320 can be configured differently in other examples. The operator can for example fully or partially control the operation of one or more AMUs 105 through the I/O device 320. The operator can also receive information, such as the operational status of one or more AMUs 105, the base station 110, and/or the WMS 120 as well as other information, through the I/O device 320. For instance, the operator can verbally request information and/or provide commands via the microphone 305, and the processor 310 can provide the requested information and/or acknowledgement of the command through the I/O device 320. While in the illustrated embodiment, the microphone 305 and I/O device 320 are illustrated as separate components, the microphone 305 and I/O device 320 can be integrated together to form a unitary component.

The base station 110 further includes a transceiver 325, which is operatively coupled to the processor 310, to allow the base station 110 to communicate over the network 125 with other pieces of equipment in the AMU system 100. The processor 310 is configured to receive voice commands from the operator via the microphone 305 and transmit all or part of the resulting audio file with a recording of the voice command and/or other information to the WMS 120 via the transceiver 325. In one variation, very little speech recognition processing of the voice commands is performed locally by the processor 310, and instead, the audio information of all voice commands is sent by the transceiver 325 for processing by the WMS 120. Once the audio is processed by the WMS 120, the resulting command and/or information is sent to the appropriate AMU 105 and/or base station 110. In the meantime, the I/O device 320 can provide an acknowledgement of the voice command via the I/O device 320 such as by providing a visual indication (e.g., by lighting an indicator light) and/or an audio acknowledgement (e.g., a voice stating "your command has been received").

In another variation, some voice commands are processed locally by the processor 310 on the base station 110 to avoid latency issues. For example, speech recognition of safety related commands (e.g., "stop") in one variation are performed locally by the processor 310 of the base station 110. The transceiver 325 is then used to directly communicate with the equipment at issue. For example, if the operator says the words "stop all close AMUs", the processor 310 of the base station 110 can issue a command via the transceiver 325 directly to all AMUs 105 within a predefined range (e.g., 10 meters) of the base station 110 to stop. The AMUs 105 can reply to the base station 110 to indicate that they are stopped. If a reply from a particular AMU 105 is not received, the base station 110 can take other corrective actions such as reporting the issue to the WMS 120.

Figure 4:
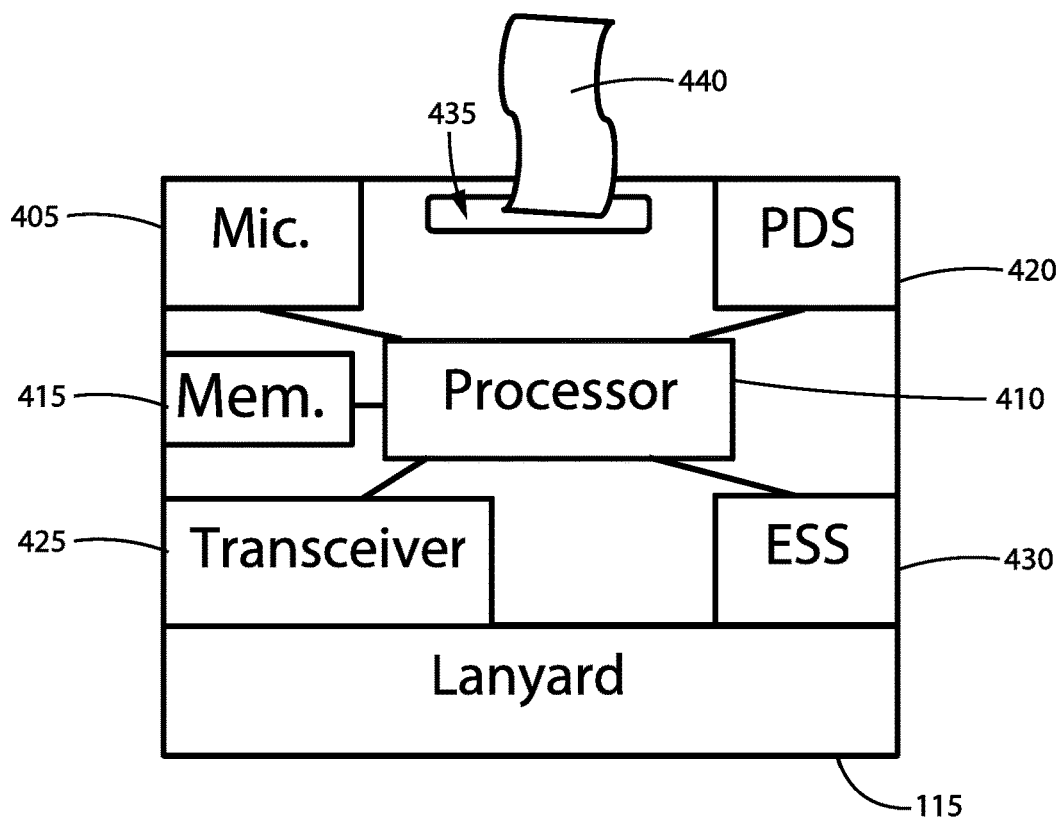
FIG. 4 is a diagrammatic view of a lanyard found in the FIG. 1 AMU system.

Turning to FIG. 4, the lanyard 115 provides a further way for an individual to control the AMU 105 via voice commands. An operator or other individual can verbally control one or more AMUs 105 via the lanyard 115. Warehouses and manufacturing plants can be rather noisy such that the microphone 205 on the AMU 105 might not be able to pick up or understand a voice command from an individual. Moreover, echoing or other poor acoustics within warehouses or other facilities can be problematic such that a voice safety command may be unintentionally picked up by other AMUs 105 that are remote from the individual thereby resulting in unintended actions by the remote AMUs 105. The lanyard 115 is usually worn by or otherwise held in close proximity to the individual so as to enhance sound quality and speech recognition. Moreover, as will be described below, the location of the individual can be tracked with the lanyard 115 so that only AMUs 105 in close proximity to the individual are controlled when a safety command is issued and not remote AMUs 105 and/or those that impose no safety risk (e.g., stationary or deactivated AMUs 105).

As shown, the lanyard 115 includes a microphone 405 configured to receive verbal or other auditory commands from the operator. The microphone 405 is operatively coupled to a processor 410 that processes commands and/or data for the lanyard 115. The lanyard 115 further includes memory 415 to store and retrieve information that is communicated to the processor 410. The lanyard 115 further includes a Position Detection System ("PDS") 420 that is operatively coupled to the processor 410. The PDS 420 is configured to determine the position of the lanyard 115. The PDS 420 can determine position through indoor position determination techniques, outdoor position determination techniques, dead reckoning techniques, or a combination of these techniques. For indoor position determination, the PDS 420 can use an Indoor Positioning System ("IPS") that locates objects or people inside a building using lights, radio waves, magnetic fields, acoustic signals, and/or other sensory information. In one particular example, the PDS 420 determines position by measuring the distance to one or more anchoring nodes with known fixed positions (e.g., Wi-Fi/LiFi access points and/or Bluetooth® beacons). When the AMUs 105 are for example used outdoors, such as in outdoor storage lots, the PDS 420 can utilize outdoor position determination techniques like a satellite based technique such as with a Global Positioning System ("GPS"). In another form, the PDS 420 can include an Inertial Measurement Unit ("IMU") that measures the specific force of the lanyard 115, the angular rate of the lanyard 115, and sometimes the magnetic field surrounding the lanyard 115.

Some or all of the position determination can be locally determined through the processor 410 and/or PDS 420 in one variation. To conserve energy as well as reduce processing requirements, some or all of the position determination can be offloaded to be remotely determined by the WMS 120. For instance, the lanyard 115 can transmit the raw data from the PDS 420 to the WMS 120, and the WMS 120 can then calculate the position of the lanyard 115.

The lanyard 115 further includes a transceiver 425, which is operatively coupled to the processor 410, to allow the lanyard 115 to communicate over the network 125 with other pieces of equipment in the AMU system 100. The lanyard 115 further includes an Energy Storage System ("ESS") 430, such as a battery or capacitor, that provides portable power to the lanyard 115. The processor 410 is configured to receive voice commands from the operator via the microphone 405 and transmit all or part of the resulting audio file with a recording of the voice command and/or other information to the WMS 120 via the transceiver 425. In one variation, very little speech recognition processing of the voice commands is performed locally by the processor 410, and instead, the audio information of all voice commands is sent by the transceiver 425 for processing by the WMS 120. Once the audio is processed by the WMS 120, the resulting command and/or information is sent to the appropriate AMU 105, base station 110, and/or lanyard 115. Based on the location information provided by the PDS 420, the WMS 120 can determine the appropriate AMUs 105 and/or base stations 110 proximal to the lanyard 115 that should receive the operational instructions and/or information.

In another variation, some voice commands are processed locally by the processor 410 on the lanyard 115 to avoid latency issues. For example, speech recognition of safety related commands (e.g., "stop") in one variation is performed locally by the processor 410 of the lanyard 115. The transceiver 425 is then used to directly communicate with the equipment at issue. For example, if the operator says the words "stop all close AMUs", the processor 410 of the lanyard 115 can issue a command via the transceiver 425 directly to all AMUs 105 within a predefined range (e.g., 10 meters) of the lanyard 115 to stop based on the location information from the PDS 420. The AMUs 105 can reply to the lanyard 115 to indicate that they are stopped. If a reply from a particular AMU 105 is not received, the lanyard 115 can take other corrective actions such as reporting the issue to the WMS 120.

In the illustrated example, the lanyard 115 defines a strap slot 435 through which a strap 440 is looped. The strap 440 in one form can be worn around the neck of an individual, but the lanyard 115 can be worn in other ways. The strap 440 can be secured to the lanyard 115 in other ways besides through the strap slot 435. For instance, a clip can be used to secure the strap 440 to the rest of the lanyard 115. Again, the lanyard 115 is typically worn by or associated with one or more individuals so that the WMS 120 can track the position of individuals within a facility, and if needed, change the movement and/or operation of AMUs 105 within the facility to avoid collisions with or other accidents between the AMU 105 and the individual wearing the lanyard 115. In one form, the lanyard 115 is in the form of a plastic encased card with the strap 440 that is worn around the neck of an individual. In another example, the lanyard 115 is sized and shaped in a fashion similar to a credit card so that the lanyard 115 can be temporarily stored in a purse or pocket. In still yet another version, the lanyard 115 can be clipped to or otherwise incorporated into clothing such as a safety vest.

Figure 5:
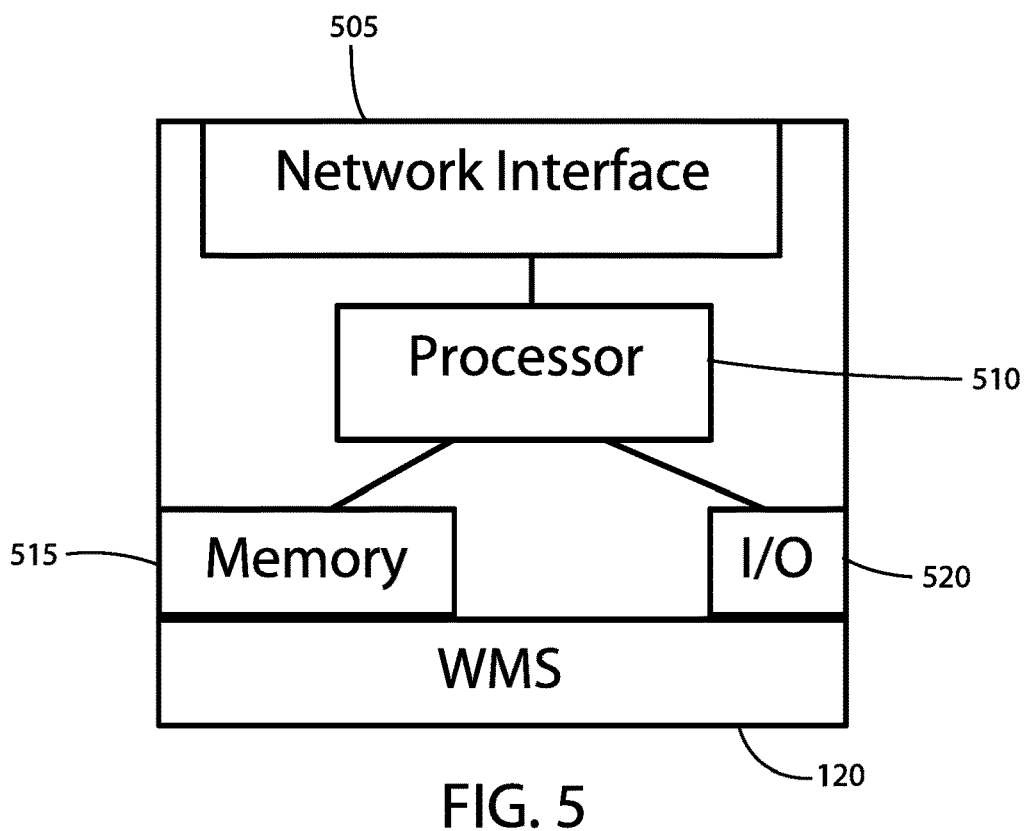
FIG. 5 is a diagrammatic view of a Warehouse Management System ("WMS") used in the FIG. 1 AMU system.

Referring now to FIG. 5, the WMS 120 in one version is in the form of a computer, such as a server, that includes software for managing inventories within a storage facility. The WMS 120 includes a network interface 505 that allows the WMS 120 to communicate over the network 125. In one form, the network interface 505 includes a Network Interface Card ("NIC"). Like most computers, the WMS 120 further includes a processor 510, memory 515, and an I/O device 520. The memory 515 can include a database that tracks the location equipment as well as individuals and supply levels of various items in the AMU system 100. The processor 510 can be used to perform speech recognition for the voice commands when needed and provide appropriate instructions and information to the AMUs 105 and base stations 110 in the AMU system 100.

Figure 6:
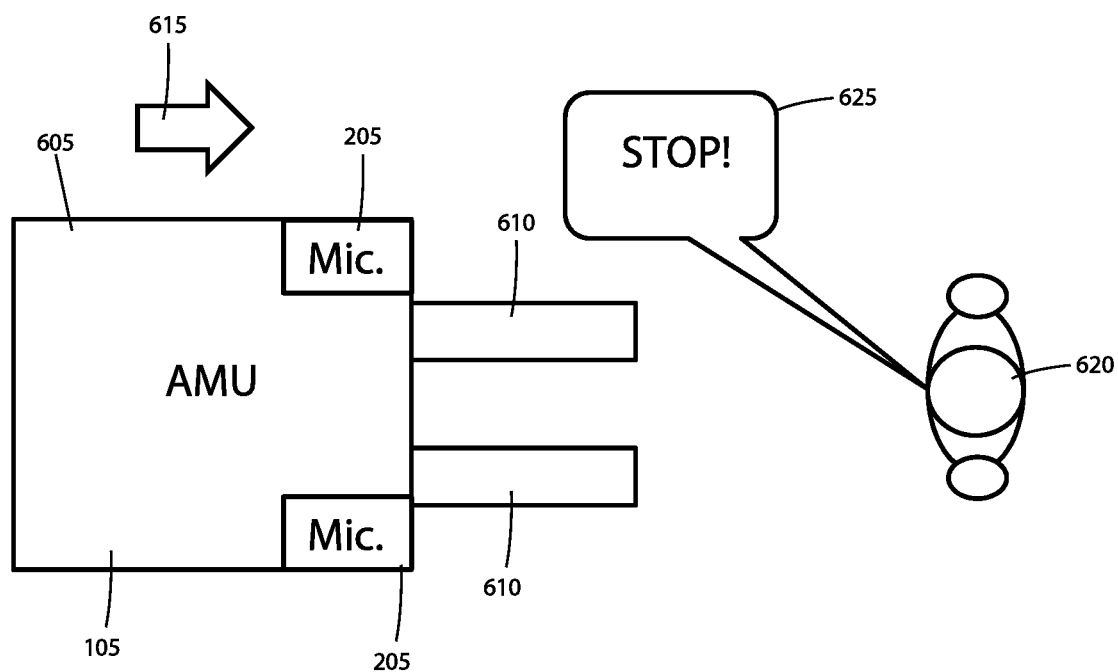
FIG. 6 is a diagrammatic view of a first example of an individual verbally controlling an automated forklift in the FIG. 1 AMU system.

A technique for verbally controlling the AMU 105 in the AMU system 100, such as with a safety command, will now be described with reference to FIGS. 6 and 7. Looking at FIG. 6, the AMU 105 in the illustrated example is an automated forklift 605 that includes the same components as those shown with the FIG. 2 AMU 105. The microphones 205 for the automated forklift 605 are only shown in FIG. 6 for the sake of clarity, but it should be recognized that the automated forklift 605 incorporates the previously described components. For example, the automated forklift 605 includes the controller 210, memory 215, GNC system 220, sensors 225, I/O device 230, and transceiver 235 of the types described before. In addition, the automated forklift 605 includes material handling equipment in the form of one or more forks 610. In the depicted example, the automated forklift 605 is moving in the direction as indicated by arrow 615. An individual 620 issues a verbal instruction 625 which is received via the microphones 205 on the automated forklift 605. While this technique will be described with respect to receiving and processing the verbal instruction 625 with the AMU 105, this technique can be used with the base station 110 and lanyard 115 of the AMU system 100.

Figure 7:
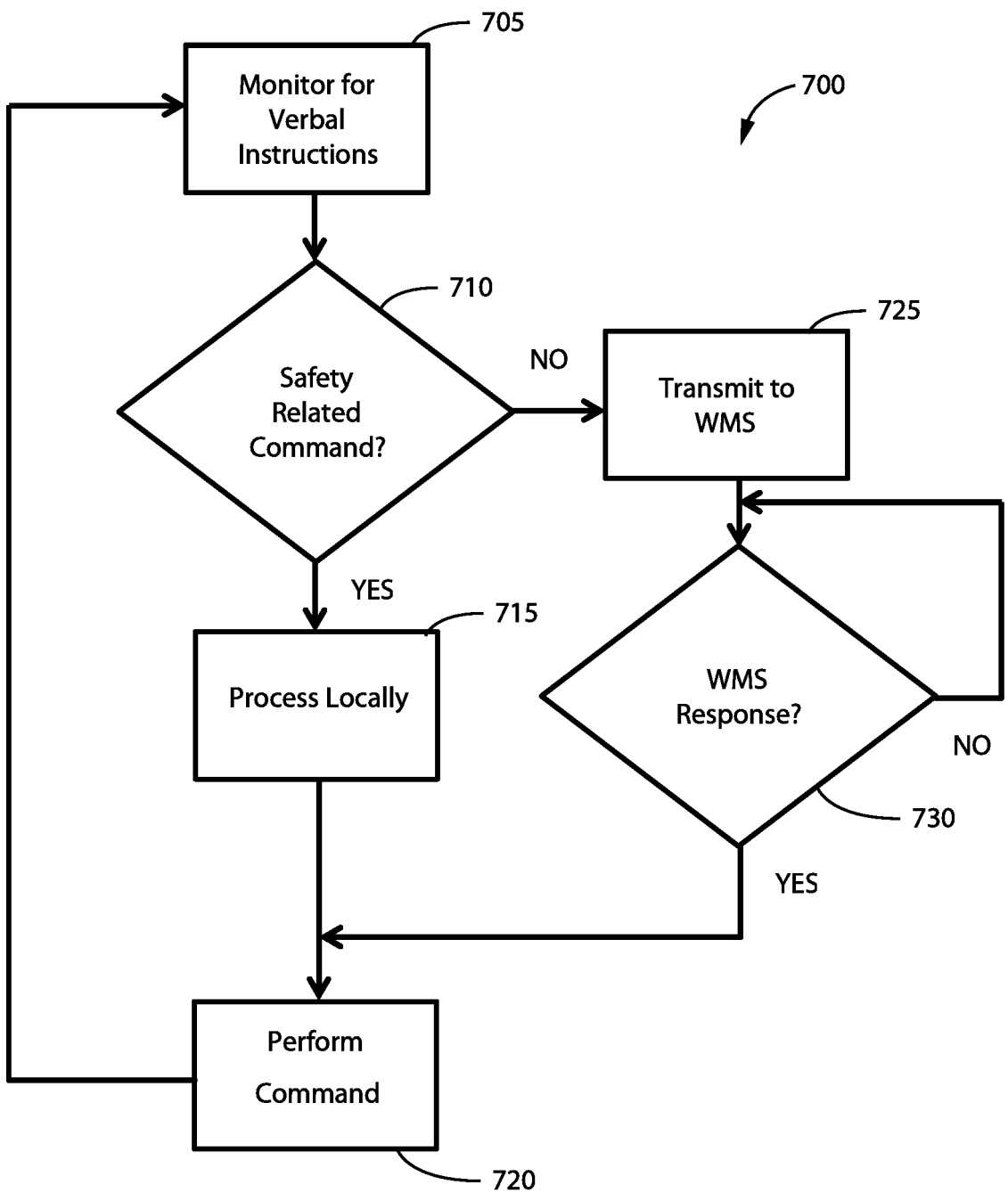
FIG. 7 is a flowchart for a first technique for verbally controlling the FIG. 6 automated forklift.

A flowchart 700 illustrating this technique for verbally controlling the AMU 105 (e.g., the automated forklift 605) is shown in FIG. 7. In stage 705, the controller 210 of the automated forklift 605 via the microphone 205 monitors for one or more verbal instructions 625. In one example, the automated forklift 605 requires a wake word (e.g., "Hey, forklift") in order to take action on the verbal instruction 625. In other examples, such as when a verbal safety command is used (e.g., "stop", "turn", "reverse", etc.), the wake word can be optional or not used. As should be recognized, when under the pressure of a hazardous situation, the individual 620 may forget the wake word, and by not requiring the wake word for a safety command, the chances of accident avoidance between the automated forklift 605 and individual 620 are enhanced. In one specific example, wake words are not required in stage 705 for verbal instructions 625 that are safety related commands, and wake words are required for non-safety related commands, instructions, or requests so as to reduce accidental activation.

In stage 710, the controller 210 of the automated forklift 605 determines whether the verbal instruction 625 heard via the microphones 205 is a safety related command. The automated forklift 605 stores in memory 215 a list of commands or speech characteristics that are indicative of a safety related command. The safety command generally concerns a request for an action to be performed by the AMU 105 that prevents imminent harm or damage to a human, a piece of equipment, and/or a structure, or even to the AMU 105. In the example illustrated in FIG. 6, the automated forklift 605 is travelling in the direction indicated by arrow 615 towards the individual 620. In this case, the verbal instruction 625 is a safety command (i.e., "Stop!") because the command is intended to avoid imminent harm caused by the automated forklift 605 running into the individual 620. It should be made clear that this technique is intended to act as a supplement to other preexisting safety equipment and software on the automated forklift 605 (e.g., light curtains, vision systems, safety sensors, etc.) and is not intended to replace these already existing safety features. The controller 210 of the automated forklift 605 in stage 710 performs an initial pass using local voice recognition processing to determine if the verbal instruction 625 is possibly a safety related command. In one example, probability or confidence thresholds are used to make the determination. To err on the side of caution, a low confidence threshold is used (e.g., greater than 30% confidence), but higher thresholds (e.g., greater than 50%) can be used in other examples.

Once the controller 210 of the automated forklift 605 determines that the verbal instruction 625 is more likely than not a safety command according to the thresholds stored in memory 215, the controller 210 further processes the verbal instruction 625 using additional speech recognition techniques to determine the exact safety command. Usually, but not always, safety commands are a short word or phrase of one or a few syllables. Due to the short length and/or tone of the verbal instruction 625, the automated forklift 605 may infer that the verbal instruction 625 concerns a safety command but may not know which particular safety command the verbal instruction 625 concerns. By performing speech recognition locally on the controller 210 of the automated forklift 605 in stage 715, latency can be reduced which in turn speeds up response time by the automated forklift 605. Based on the identified safety command, the controller 210 retrieves the one or more corresponding action instructions from memory 215, and the controller 210 instructs the appropriate equipment within the automated forklift 605 to perform the required actions in stage 720. For example, the automated forklift 605 in FIG. received "Stop!" as the verbal instruction 625. Based on this safety command, the controller 210 instructs the GNC system 220, braking system, and/or drivetrain to stop the automated forklift 605. Of course, the automated forklift 605 can take different actions depending on the safety instruction. For example, the automated forklift 605 can turn if instructed to turn or slow down if the verbal instruction 625 was to slow down. With this technique, when the base station 110 or lanyard 115 receives the verbal instruction 625, the base station 110 or lanyard 115 processes the verbal instruction 625 in the same fashion as described above. At stage 720, the base station 110 or lanyard 115 transmits the safety command directly to the automated forklift 605 via network 125, and the automated forklift 605 performs the instructed safety action (e.g., stops).

On the other hand, if the controller 210 of the automated forklift 605 determines the verbal instruction 625 is likely not a safety related command in stage 710 (or later during subsequent speech recognition processing in stage 715), the controller 210 transmits a recording file of the verbal instruction 625 and/or other data (e.g., the likely command based on local processing) to the WMS 120 via the transceiver 235 in stage 725. At stage 730, the controller 210 of the automated forklift 605 waits for a response from the WMS 120. After the response is received from the WMS 120 over the network 125, the automated forklift 605 performs the one or more actions and/or provides the requested information in stage 720. For example, the individual 620 via the verbal instruction 625 can ask for the nearest open storage location, and the automated forklift 605 can identify the location with the I/O device 230, or even travel to the open storage location based on the instructions provided by the WMS 120. In certain cases, such as when the verbal instruction 625 concerns the operational status of the automated forklift 605 (e.g., battery level), the automated forklift 605 can process the verbal instruction 625 locally as well.

A technique for verbally changing the workflow or tasks of the AMU 105 in the middle of the workflow will now be described with reference to FIGS. 8 and 9. The technique will be described with reference to the environment or conditions shown in FIG. 8, but it should be recognized that this technique can be used in other situations. Moreover, the technique will be described with reference to the FIG. 6 automated forklift 605, but other types of AMUs 105 can be used.

Figure 8:
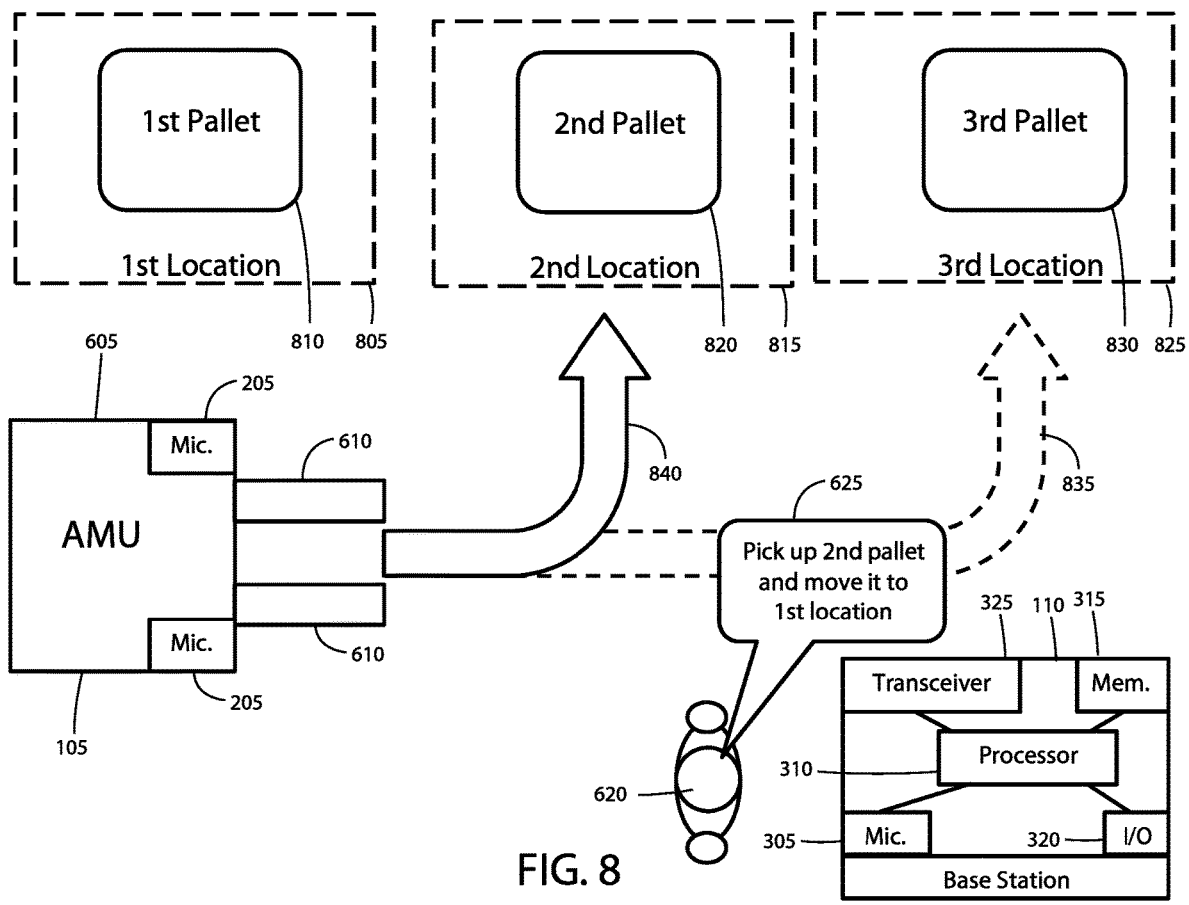
FIG. 8 is a diagrammatic view of a second example of the individual verbally controlling the FIG. 6 automated forklift.

As shown in FIG. 8, a first storage location 805 is where a first pallet 810 is initially stored, and a second storage location 815 is where a second pallet 820 is stored. Similarly, a third storage location 825 is where a third pallet 830 is stored. With this illustrated example, the automated forklift 605 is initially instructed to travel along an initial path 835 to the third storage location 825 in order to pick up the third pallet 830. However, in this example, the individual 620 has provided one or more verbal instructions 625 to the automated forklift 605 via the base station 110 to perform a different task. In this case, the individual 620 has instructed the automated forklift 605 to pick up the second pallet 820 at the second storage location 815 and move the second pallet 820 to the first storage location 805. The verbal instructions 625 for this technique are processed in the same fashion as described before with respect to FIG. 6 and the flowchart 700 in FIG. 7. In the illustrated example, the verbal instruction 625 is received by the base station 110, but in other examples, the lanyard 115 and/or automated forklift 605 can receive and process the verbal instructions 625. Given the verbal instruction 625 is a non-safety related command in the illustrated example, the verbal instruction 625 is transmitted to the WMS 120 (see stage 725 in FIG. 7), and the WMS 120 provides instructions to the automated forklift 605 to travel along a detour path 840 to the second storage location 815. In accordance with the instructions, the automated forklift 605 picks up the second pallet 820 with the forks 610 and moves the second pallet 820 to the first storage location 805. After the task of moving the second pallet 820 to the first storage location 805 is complete, the automated forklift 605 resumes the initial task of picking up the third pallet 830 by moving along the initial path 835 or a similar path.

Figure 9:
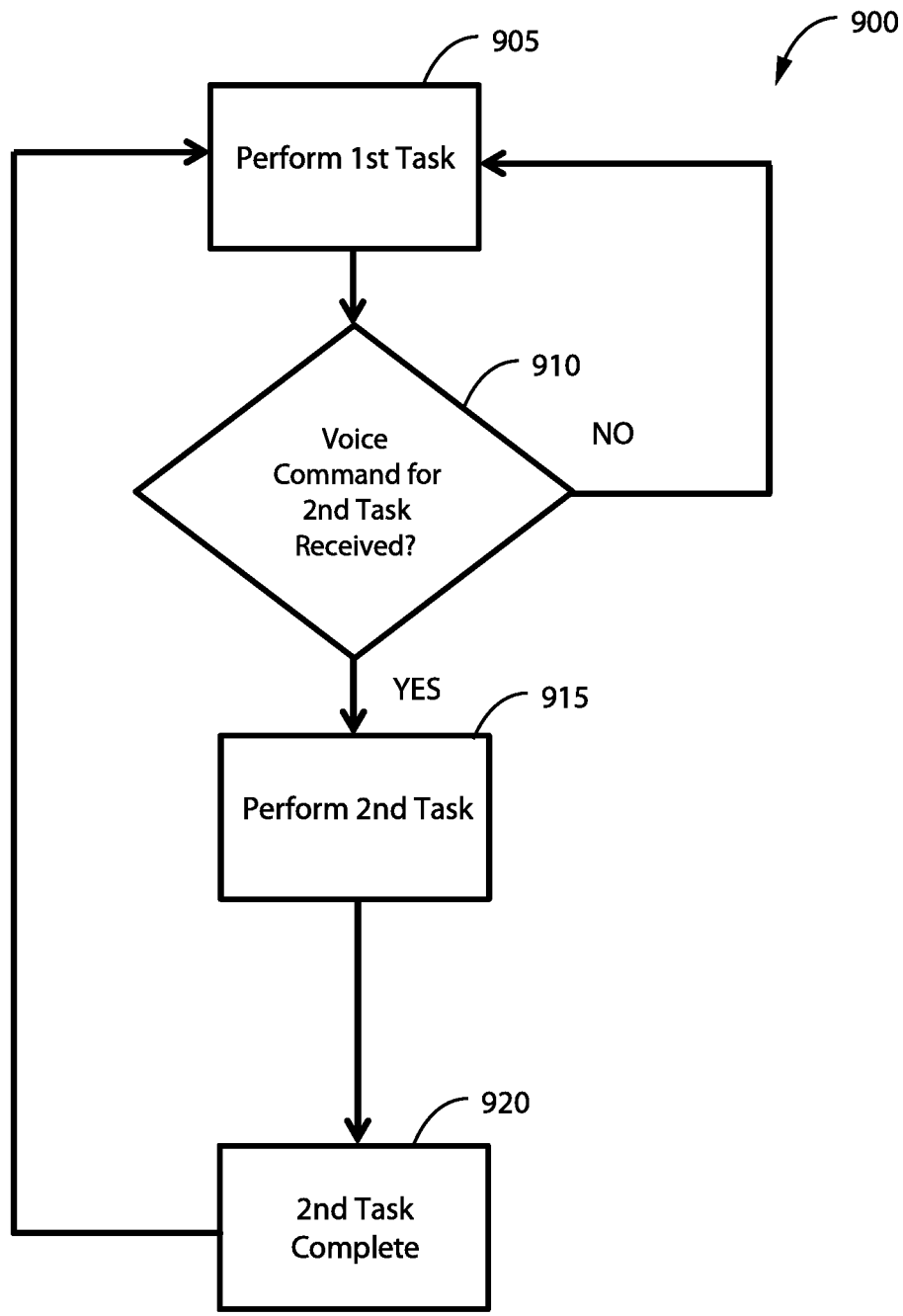
FIG. 9 is a flowchart for a second technique of verbally controlling the FIG. 6 automated forklift.

A more generalized form of this technique is illustrated with a flowchart 900 in FIG. 9. In stage 905, the automated forklift 605 is performing a first task. For the FIG. 8 example, the first task of stage 905 was moving along the initial path 835 to pick up the third pallet 830 at the third storage location 825. The first pallet 810 receives the verbal instruction 625 and transmits the verbal instruction 625 to the WMS 120 where the verbal instruction 625 is processed. While the automated forklift 605 performs the first task, the automated forklift 605 monitors to see if a second task is received from the WMS 120 or directly from the individual 620 in stage 910. If no new command is received, the automated forklift 605 continues to perform the first task of stage 905 by travelling along the initial path 835. However, once the automated forklift 605 receives the second task from the WMS 120 in stage 910, the automated forklift 605 performs the second task in stage 915. Once more, in the FIG. 8 example, the automated forklift 605 moves off the initial path 835 and travels along the detour path 840 to the second storage location 815 where the automated forklift 605 performs the task of moving the second pallet 820 to the first storage location 805. For instance, the controller 210 of the automated forklift 605 provides the path coordinates of the detour path 840 to the GNC system 220. Once the second task is complete in stage 920, the automated forklift 605 resumes performance of the first task in stage 905. For the FIG. 8 example, the controller 210 instructs the GNC system 220 to move the automated forklift 605 back along the initial path 835 and to the third storage location 825 in order to pick up the third pallet 830. In other examples, subsequent verbal instructions 625 to perform additional tasks (e.g., for third and fourth tasks) can temporarily interrupt the prior first and second tasks in a similar fashion as described before.

Figure 10:
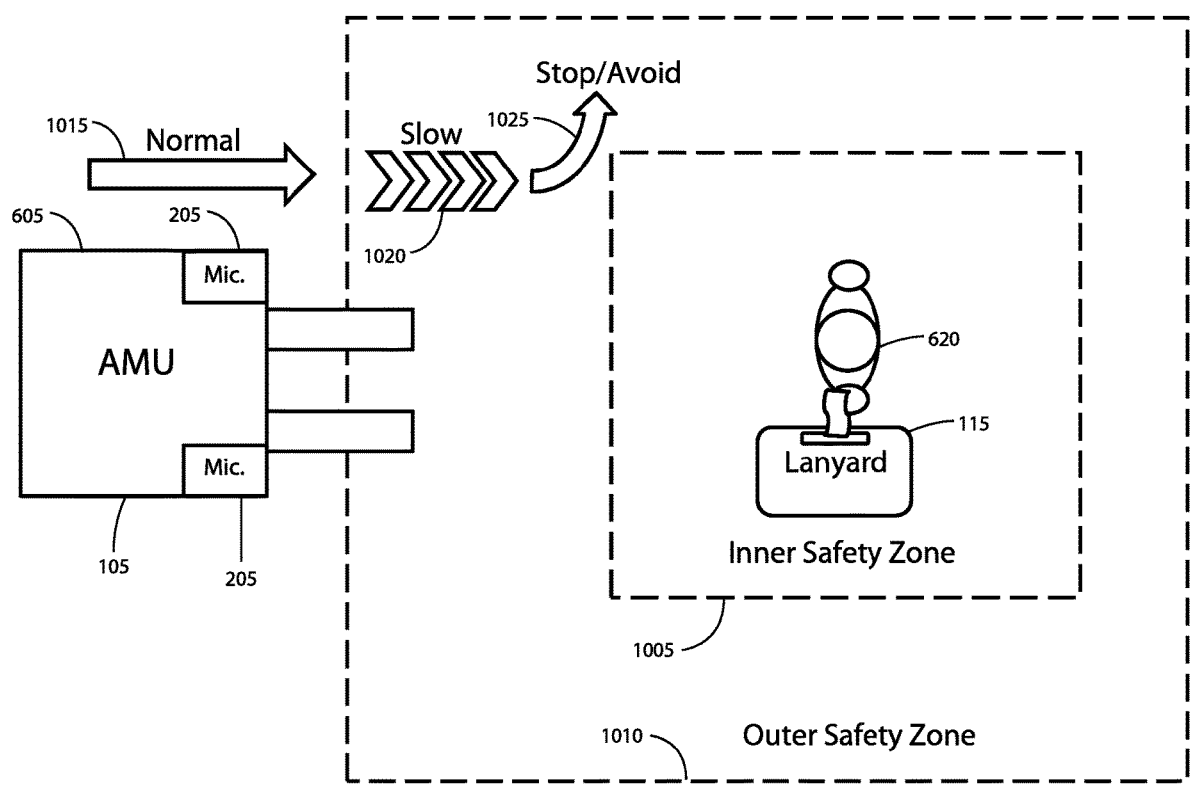
FIG. 10 is a diagrammatic view of an example of safety control of the FIG. 6 automated forklift using geo-fencing.

A safety technique for changing the operation of the AMU 105 based on the proximity of the individual 620 will now be described with reference to t FIGS. 10 and 11. This technique in one form is used in conjunction with the earlier described voice control techniques of FIGS. 6, 7, 8, and 9. This technique will be again described with reference to the automated forklift 605 but other types of AMUs 105 can perform this technique. As shown in FIG. 10, the individual 620 wears the lanyard 115. Once more, the lanyard 115 has the PDS 420 that provides the location of the individual 620 to the automated forklift 605. The location of the lanyard 115 can be directly provided by the lanyard 115 communicating the location information to the automated forklift 605 over the network 125. Alternatively or additionally, this location information for the lanyard 115 can be indirectly sent to the automated forklift 605 via the WMS 120. The lanyard 115 sends the location information (e.g., positional coordinates, velocity, acceleration, etc.) to the WMS 120 and/or the WMS 120 determines the location information about the lanyard 115 based on raw data from the PDS 420. The WMS 120 can broadcast this location information about the lanyard 115 to all AMUs 105 in the AMU system 100 or only to select AMUs 105 that are active and/or near the individual 620 wearing the lanyard 115. This location information can be sent in a periodic manner and/or pushed out when the location of the lanyard 115 changes.

In one variation, the WMS 120 further provides coordinates for one or more geo-fence safety zones around the individual 620 wearing the lanyard 115. Alternatively or additionally, the automated forklift 605 determines the geo-fence safety zones. In the illustrated example, these geo-fence zones include an inner safety zone 1005 and an outer safety zone 1010, but other examples can include more or less zones than is shown. Moreover, the shape of the inner safety zone 1005 and outer safety zone 1010 can be different from the rectangular grid shown in FIG. 10. For instance, the zones can have a circular/spherical or an irregular shape. FIG. 10 further show arrows that symbolize the operational mode of the automated forklift 605 in and around these zones. For instance, arrow 1015 shows the state of operation when the automated forklift 605 is outside of the outer safety zone 1010, and arrow 1020 along with arrow 1025 show the operational state of the automated forklift 605 when within the outer safety zone 1010 and in close proximity to the inner safety zone 1005.

Figure 11:
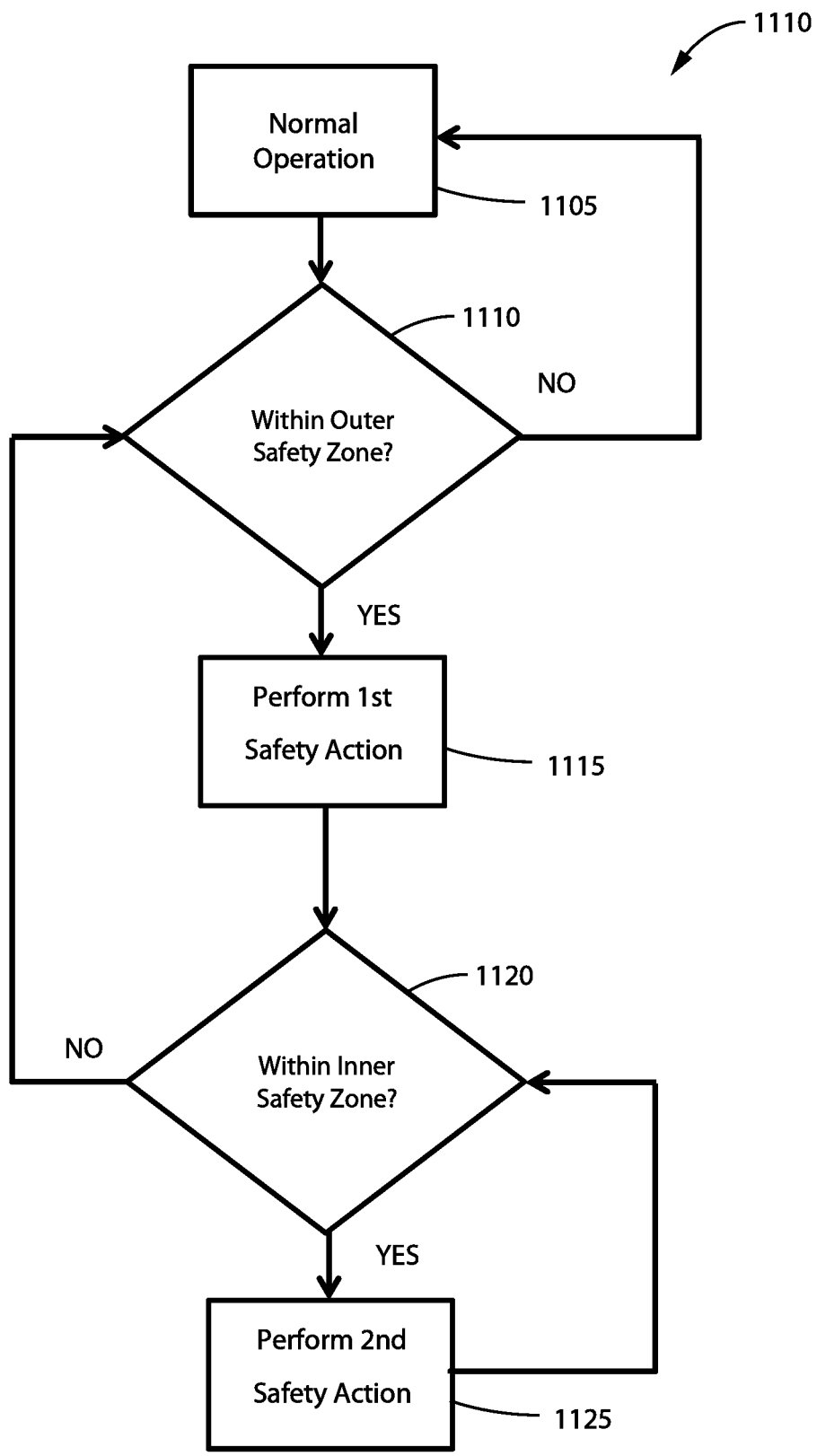
FIG. 11 is a flowchart for a collision avoidance technique performed by the FIG. 6 automated forklift using geo-fencing.

FIG. 11 show a flowchart 1100 for this technique. In stage 1105, the automated forklift 605 travels at the normal or usual operational speed and direction for the automated forklift 605. The determination of relative location of the lanyard 115 and automated forklift 605 will be described as the automated forklift 605 making this determination, but in other variations, the WMS 120 can make this zone location determination either alone or in cooperation with the automated forklift 605 as well as the lanyard 115. The automated forklift 605 in stage 1110 determines whether or not the automated forklift 605 is in the outer safety zone 1010 for the lanyard 115. When outside the outer safety zone 1010, the automated forklift 605 operates in the normal manner of stage 1105 as is indicated by stage 1015. However, when the automated forklift 605 enters the outer safety zone 1010, the automated forklift 605 performs a first safety action in stage 1115 to avoid injuring the individual 620. In the FIG. 10 example, when entering the outer safety zone 1010, the automated forklift 605 slows down to a speed and/or moves in a direction as indicated by arrow 1020 where the automated forklift 605 and/or individual 620 can easily recognize and make movement corrections without colliding with one another. In other examples, the automated forklift 605 can take alternative or additional safety actions, such as retracting or enclosing hazardous equipment, when entering the outer safety zone 1010. The controller 210 in stage 1120 then determines if the automated forklift 605 is within or near the inner safety zone 1005 in stage 1120. When outside or not near the inner safety zone 1005, the controller 210 of the automated forklift 605 then monitors whether or not the automated forklift 605 is still within the outer safety zone 1010 in stage 1110. If not, the automated forklift 605 returns to normal operation (1015) in stage 1105 and proceeds in the same fashion as described before.

When the automated forklift 605 closely approaches or is inside the inner safety zone 1005 in stage 1120, the automated forklift 605 performs a second safety action in stage 1125 that is typically more cautious or drastic than the first safety action. For instance, as indicated by arrow 1025 in FIG. 10, the automated forklift 605 stops or turns to avoid the individual 620 when approaching the inner safety zone 1005. The automated forklift 605 can take other actions in stage 1125. For example, the automated forklift 605 can power down, move away from the lanyard 115 to maintain a safe distance, and/or return to a safe storage location for the automated forklift 605, to name just a few examples. As shown by the flowchart 1100 in FIG. 11, the controller 210 continues to monitor the position of the automated forklift 605 relative to the inner safety zone 1005 and outer safety zone 1010, and the automated forklift 605 continues to take the appropriate safety action. Once outside the outer safety zone 1010, the forklift 605 returns to normal operation (see arrow 1015 in FIG. 10) in stage 1105.

Glossary of Terms

The language used in the claims and specification is to only have its plain and ordinary meaning, except as explicitly defined below. The words in these definitions are to only have their plain and ordinary meaning. Such plain and ordinary meaning is inclusive of all consistent dictionary definitions from the most recently published Webster's dictionaries and Random House dictionaries. As used in the specification and claims, the following definitions apply to these terms and common variations thereof identified below.

"Autonomous Mobile Unit System" or "AMU System" generally refers to a mechanism used to transport items via one or more AMUs that move along an AMU frame. The AMUs in the AMU system are able to at least move in two spatial directions (i.e., in a vertical direction and a horizontal direction) along the AMU frame. In another form, the AMU is able to move in all three spatial dimensions within the AMU frame. The AMU system can include an infeed AMU system that typically (but not always) supplies items to a buffering system. The AMU system can further include a discharge AMU system that typically (but not always) discharges items from the buffering system.

"Autonomous Mobile Unit" or "AMU" generally refer to a mobile robot that is able to automatically self-navigate between various locations. For example, AMUs are typically, but not always, able to automatically navigate by following markers, such as wires or magnets embedded in the floor, by using lasers, and/or by using one or more vision systems. AMUs are also typically, but not always, designed to automatically avoid collisions, such as with other AMUs, equipment, and personnel. AMUs are commonly, but not always, used in industrial applications to move materials around a manufacturing facility or warehouse.

"Beacon" or "Beacon Transmitter" generally refers to a system or apparatus configured to transmit data using electromagnetic energy. The broadcasted data may include any suitable data such as a string of alphanumeric characters uniquely identifying one beacon from others in the environment. Data may appear in a single field in a datagram, or in multiple separate fields. Any suitable protocol may be used to create and transmit the datagrams using any suitable arrangement of fields. The fields may include predetermined numbers of bits according to proprietary or commercially available protocols. One example of a commercially available protocol is the BLUETOOTH® LE (Low Energy) protocol, also referred to as BLUETOOTH® Smart protocol.

Datagrams may include one or more fields that may include a preamble, one or more header fields, an access address field, a Cyclical Redundancy Check (CRC) field, a Protocol Data Unit (PDU) field, a Media Access Control (MAC) address field, and a data field. The data field may include a prefix and a proximity Universal Unique Identifier (UUID) which may be configured to distinguish beacons used by one organization from those of another organization. Other data fields may include a major field which may be used to identify multiple beacons as a group, a minor field which may uniquely identify a specific beacon within a group, and a transmission power field which may indicate how far a beacon is from a receiver. The transmitter power field may include one of a set of data values representing distance ranges such as "immediate", "far", or "out of range". A transmission power field may also include more detailed ranging data such as the Received Signal Strength Indication (RSSI) of the beacon at a predetermined range such as 1 meter away. This value may be compared to a current RSSI measured by a receiver and used to calculate an approximate range.

A beacon may include a receiver allowing the beacon to begin broadcasting after receiving a signal from another transmitter. In one example, a beacon may collect energy from the electromagnetic energy directed toward it and may use this energy to transmit its data in response. This type of "passive" beacon may only transmit when energized to do so by some other transmitter. In another example, beacons may have a local power source such as a battery and may transmit continuously and/or at predetermined intervals. In either case, the data sent by the beacon may pass through walls or other objects between the beacon and a receiver making it unnecessary to maintain an unobstructed line of sight between the two.

A beacon may transmit on any suitable frequency or group of frequencies in the electromagnetic spectrum. For example, a beacon may transmit in the Very High Frequency range (VHF), the Ultra High Frequency range (UHF), or in the Super High Frequency range (SHF). Transmissions from a beacon may be directed along a narrow beam by a directional antenna system used by the beacon, or the beacon may use an omnidirectional antenna system configured to broadcast the data in all directions at about the same time. In one form, the beacon is an off-the-shelf product that is purchased.

The data may be programmed in a memory such as a nonvolatile memory in the beacon for repeated transmission at predetermined intervals. For example, transmissions may be repeated up to about every 500 ms, up to about every 2 seconds, up to about every 30 seconds, or at intervals greater than 30 seconds apart. Beacons may transmit at a very low Transmitter Power Output (TPO) and/or Effective Radiated Power (ERP). TPO or ERP may be less than about 100 milliwatts, less than about 10 milliwatts, or less than about 1 milliwatt.

Examples of commercially available suitable beacon transmitters include beacons available from Estimote, Inc. of New York, N.Y., USA, or from Gimbal, Inc., of San Diego, Calif., USA.

"Computer" generally refers to any computing device configured to compute a result from any number of input values or variables. A computer may include a processor for performing calculations to process input or output. A computer may include a memory for storing values to be processed by the processor, or for storing the results of previous processing.

A computer may also be configured to accept input and output from a wide array of input and output devices for receiving or sending values. Such devices include other computers, keyboards, mice, visual displays, printers, industrial equipment, and systems or machinery of all types and sizes. For example, a computer can control a network interface to perform various network communications upon request. The network interface may be part of the computer, or characterized as separate and remote from the computer.

A computer may be a single, physical, computing device such as a desktop computer, a laptop computer, or may be composed of multiple devices of the same type such as a group of servers operating as one device in a networked cluster, or a heterogeneous combination of different computing devices operating as one computer and linked together by a communication network. The communication network connected to the computer may also be connected to a wider network such as the Internet. Thus, a computer may include one or more physical processors or other computing devices or circuitry, and may also include any suitable type of memory.

A computer may also be a virtual computing platform having an unknown or fluctuating number of physical processors and memories or memory devices. A computer may thus be physically located in one geographical location or physically spread across several widely scattered locations with multiple processors linked together by a communication network to operate as a single computer.

The concept of "computer" and "processor" within a computer or computing device also encompasses any such processor or computing device serving to make calculations or comparisons as part of disclosed system. Processing operations related to threshold comparisons, rules comparisons, calculations, and the like occurring in a computer may occur, for example, on separate servers, the same server with separate processors, or on a virtual computing environment having an unknown number of physical processors as described above.

A computer may be optionally coupled to one or more visual displays and/or may include an integrated visual display. Likewise, displays may be of the same type, or a heterogeneous combination of different visual devices. A computer may also include one or more operator input devices such as a keyboard, mouse, touch screen, laser or infrared pointing device, or gyroscopic pointing device to name just a few representative examples. Also, besides a display, one or more other output devices may be included such as a printer, plotter, industrial manufacturing machine, 3D printer, and the like. As such, various display, input and output device arrangements are possible.

Multiple computers or computing devices may be configured to communicate with one another or with other devices over wired or wireless communication links to form a communication network. Network communications may pass through various computers operating as network appliances such as switches, routers, firewalls or other network devices or interfaces before passing over other larger computer networks such as the internet. Communications can also be passed over the communication network as wireless data transmissions carried over electromagnetic waves through transmission lines or free space. Such communications include using WiFi or other Wireless Local Area Network (WLAN) or a cellular transmitter/receiver to transfer data. Such signals conform to any of a number of wireless or mobile telecommunications technology standards such as 802.11a/b/g/n, 3G, 4G, and the like.

"Controller" generally refers to a device, using mechanical, hydraulic, pneumatic electronic techniques, and/or a microprocessor or computer, which monitors and physically alters the operating conditions of a given dynamical system. In one nonlimiting example, the controller can include an Allen Bradley brand Programmable Logic Controller (PLC). A controller may include a processor for performing calculations to process input or output. A controller may include a memory for storing values to be processed by the processor or for storing the results of previous processing. A controller may also be configured to accept input and output from a wide array of input and output devices for receiving or sending values. Such devices include other computers, keyboards, mice, visual displays, printers, industrial equipment, and systems or machinery of all types and sizes. For example, a controller can control a network or network interface to perform various network communications upon request. The network interface may be part of the controller, or characterized as separate and remote from the controller. A controller may be a single, physical, computing device such as a desktop computer or a laptop computer, or may be composed of multiple devices of the same type such as a group of servers operating as one device in a networked cluster, or a heterogeneous combination of different computing devices operating as one controller and linked together by a communication network. The communication network connected to the controller may also be connected to a wider network such as the Internet. Thus a controller may include one or more physical processors or other computing devices or circuitry and may also include any suitable type of memory. A controller may also be a virtual computing platform having an unknown or fluctuating number of physical processors and memories or memory devices. A controller may thus be physically located in one geographical location or physically spread across several widely scattered locations with multiple processors linked together by a communication network to operate as a single controller. Multiple controllers or computing devices may be configured to communicate with one another or with other devices over wired or wireless communication links to form a network. Network communications may pass through various controllers operating as network appliances such as switches, routers, firewalls or other network devices or interfaces before passing over other larger computer networks such as the Internet. Communications can also be passed over the network as wireless data transmissions carried over electromagnetic waves through transmission lines or free space. Such communications include using WiFi or other Wireless Local Area Network (WLAN) or a cellular transmitter/receiver to transfer data.

"Data" generally refers to one or more values of qualitative or quantitative variables that are usually the result of measurements. Data may be considered "atomic" as being finite individual units of specific information. Data can also be thought of as a value or set of values that includes a frame of reference indicating some meaning associated with the values. For example, the number "2" alone is a symbol that absent some context is meaningless. The number "2" may be considered "data" when it is understood to indicate, for example, the number of items produced in an hour.

Data may be organized and represented in a structured format. Examples include a tabular representation using rows and columns, a tree representation with a set of nodes considered to have a parent-children relationship, or a graph representation as a set of connected nodes to name a few.

The term "data" can refer to unprocessed data or "raw data" such as a collection of numbers, characters, or other symbols representing individual facts or opinions. Data may be collected by sensors in controlled or uncontrolled environments, or generated by observation, recording, or by processing of other data. The word "data" may be used in a plural or singular form. The older plural form "datum" may be used as well.

"Energy Storage System" (ESS) or "Energy Storage Unit" generally refers to a device that captures energy produced at one time for use at a later time. The energy can be supplied to the ESS in one or more forms, for example including radiation, chemical, gravitational potential, electrical potential, electricity, elevated temperature, latent heat, and kinetic types of energy. The ESS converts the energy from forms that are difficult to store to more conveniently and/or economically storable forms. By way of non-limiting examples, techniques for accumulating the energy in the ESS can include: mechanical capturing techniques, such as compressed air storage, flywheels, gravitational potential energy devices, springs, and hydraulic accumulators; electrical and/or electromagnetic capturing techniques, such as using capacitors, super capacitors, and superconducting magnetic energy storage coils; biological techniques, such as using glycogen, biofuel, and starch storage mediums; electrochemical capturing techniques, such as using flow batteries, rechargeable batteries, and ultra batteries; thermal capture techniques, such as using eutectic systems, molten salt storage, phase-change materials, and steam accumulators; and/or chemical capture techniques, such as using hydrated salts, hydrogen, and hydrogen peroxide. Common ESS examples include lithium-ion batteries and super capacitors.

"Geo-fence" generally refers to a virtual boundary generated for a real geographical area. The virtual boundary defined by a geo-fence may be monitored using a positioning system and/or any other form of location-based service.

"Guidance, Navigation, and Control (GNC) System" generally refers to a physical device, a virtual device, and/or a group of devices configured to control the movement of vehicles, such as automobiles, automated guided vehicles, ships, aircraft, drones, spacecraft, and/or other moving objects. GNC systems are typically configured to determine a desired path of travel or trajectory of the vehicle from the vehicle's current location to a designated target, as well as desired changes in velocity, rotation, and/or acceleration for following the path. The GNC system can include and/or communicate with sensors like compasses, GPS receivers, Loran-C, star trackers, inertial measurement units, altimeters, environmental sensors, and the like. At a given time, such as when the vehicle is travelling, the GNC system is configured to determine the location (in one, two, or three dimensions) and velocity of the vehicle. For example, the GNC system is able to calculate changes in position, velocity, attitude, and/or rotation rates of a moving vehicle required to follow a certain trajectory and/or attitude profile based on information about the state of motion of the vehicle. The GNC system is able to maintain or change movement of the vehicle by manipulating forces by way of vehicle actuators, such as steering mechanisms, thrusters, flaps, etc., to guide the vehicle while maintaining vehicle stability. GNC systems can be found in autonomous or semi-autonomous vehicles.

"Input/Output (I/O) Device" generally refers to any device or collection of devices coupled to a computing device that is configured to receive input and deliver the input to a processor, memory, or other part of the computing device and/or is controlled by the computing device to produce an output. The I/O device can include physically separate input and output devices, or the input and output devices can be combined together to form a single physical unit. Such input devices of the I/O device can include keyboards, mice, trackballs, and touch sensitive pointing devices such as touchpads, or touchscreens. Input devices also include any sensor or sensor array for detecting environmental conditions such as temperature, light, noise, vibration, humidity, and the like. Examples of output devices for the I/O device include, but are not limited to, screens or monitors displaying graphical output, a projecting device projecting a two-dimensional or three-dimensional image, or any kind of printer, plotter, or similar device producing either two-dimensional or three-dimensional representations of the output fixed in any tangible medium (e.g. a laser printer printing on paper, a lathe controlled to machine a piece of metal, or a three-dimensional printer producing an object). An output device may also produce intangible output such as, for example, data stored in a database, or electromagnetic energy transmitted through a medium or through free space such as audio produced by a speaker controlled by the computer, radio signals transmitted through free space, or pulses of light passing through a fiber-optic cable.

"Inertial Measurement Unit" or "IMU" generally refers to a device that measures and reports a body's specific force, angular rate, and sometimes the magnetic field surrounding the body. The IMU typically, but not always, includes one or more accelerometers and gyroscopes, and sometimes magnetometers when the surrounding magnetic fields are measured. IMUs are typically (but not always) self-contained systems that measure linear and angular motion usually with a triad of gyroscopes and triad of accelerometers. An IMU can either be gimballed or strapdown, outputting the integrating quantities of angular velocity and acceleration in the sensor/body frame. They are commonly referred to in literature as the rate-integrating gyroscopes and accelerometers. IMUs typically can be used in a wide variety of circumstances such as to maneuver vehicles, aircraft, and/or spacecraft as well as in cellphones and virtual reality glasses. The accelerometers in IMUs can include mechanical and/or electronic type accelerometers, and the gyroscopes in IMUs can include mechanical and/or electronic type gyroscopes.

"Memory" generally refers to any storage system or device configured to retain data or information. Each memory may include one or more types of solid-state electronic memory, magnetic memory, or optical memory, just to name a few. Memory may use any suitable storage technology, or combination of storage technologies, and may be volatile, nonvolatile, or a hybrid combination of volatile and nonvolatile varieties. By way of non-limiting example, each memory may include solid-state electronic Random Access Memory (RAM), Sequentially Accessible Memory (SAM) (such as the First-In, First-Out (FIFO) variety or the Last-In-First-Out (LIFO) variety), Programmable Read Only Memory (PROM), Electronically Programmable Read Only Memory (EPROM), or Electrically Erasable Programmable Read Only Memory (EEPROM).

Memory can refer to Dynamic Random Access Memory (DRAM) or any variants, including static random access memory (SRAM), Burst SRAM or Synch Burst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM).

Memory can also refer to non-volatile storage technologies such as Non-Volatile Read Access memory (NVRAM), flash memory, non-volatile Static RAM (nvSRAM), Ferroelectric RAM (FeRAM), Magnetoresistive RAM (MRAM), Phase-change memory (PRAM), Conductive-Bridging RAM (CBRAM), Silicon-Oxide-Nitride-Oxide-Silicon (SONOS), Resistive RAM (RRAM), Domain Wall Memory (DWM) or "Racetrack" memory, Nano-RAM (NRAM), or Millipede memory. Other nonvolatile types of memory include optical disc memory (such as a DVD or CD ROM), a magnetically encoded hard disc or hard disc platter, floppy disc, tape, or cartridge media. The concept of a "memory" includes the use of any suitable storage technology or any combination of storage technologies.

"Microphone" generally refers to a transducer that converts sound into an electrical signal.

"Network" or "Computer Network" generally refers to a telecommunications network that allows computers to exchange data. Computers can pass data to each other along data connections by transforming data into a collection of datagrams or packets. The connections between computers and the network may be established using either cables, optical fibers, or via electromagnetic transmissions such as for wireless network devices.

Computers coupled to a network may be referred to as "nodes" or as "hosts" and may originate, broadcast, route, or accept data from the network. Nodes can include any computing device such as personal computers, phones, and servers as well as specialized computers that operate to maintain the flow of data across the network, referred to as "network devices". Two nodes can be considered "networked together" when one device is able to exchange information with another device, whether or not they have a direct connection to each other.

Examples of wired network connections may include Digital Subscriber Lines (DSL), coaxial cable lines, or optical fiber lines. The wireless connections may include BLUETOOTH®, Worldwide Interoperability for Microwave Access (WiMAX), infrared channel or satellite band, or any wireless local area network (Wi-Fi) such as those implemented using the Institute of Electrical and Electronics Engineers' (IEEE) 802.11 standards (e.g. 802.11(a), 802.11(b), 802.11(g), or 802.11(n) to name a few). Wireless links may also include or use any cellular network standards used to communicate among mobile devices including 1G, 2G, 3G, or 4G. The network standards may qualify as 1G, 2G, etc. by fulfilling a specification or standards such as the specifications maintained by the International Telecommunication Union (ITU). For example, a network may be referred to as a "3G network" if it meets the criteria in the International Mobile Telecommunications-2000 (IMT-2000) specification regardless of what it may otherwise be referred to. A network may be referred to as a "4G network" if it meets the requirements of the International Mobile Telecommunications Advanced (IMTAdvanced) specification. Examples of cellular network or other wireless standards include AMPS, GSM, GPRS, UMTS, LTE, LTE Advanced, Mobile WiMAX, and WiMAX-Advanced.

Cellular network standards may use various channel access methods such as FDMA, TDMA, CDMA, or SDMA. Different types of data may be transmitted via different links and standards, or the same types of data may be transmitted via different links and standards.

The geographical scope of the network may vary widely. Examples include a Body Area Network (BAN), a Personal Area Network (PAN), a Local-Area Network (LAN), a Metropolitan Area Network (MAN), a Wide Area Network (WAN), or the Internet.

A network may have any suitable network topology defining the number and use of the network connections. The network topology may be of any suitable form and may include point-to-point, bus, star, ring, mesh, or tree. A network may be an overlay network which is virtual and is configured as one or more layers that use or "lay on top of" other networks.

A network may utilize different communication protocols or messaging techniques including layers or stacks of protocols. Examples include the Ethernet protocol, the internet protocol suite (TCP/IP), the ATM (Asynchronous Transfer Mode) technique, the SONET (Synchronous Optical Networking) protocol, or the SDE1 (Synchronous Digital Elierarchy) protocol. The TCP/IP internet protocol suite may include the application layer, transport layer, internet layer (including, e.g., IPv6), or link layer.

"Pallet" generally refers to a portable platform or other structure on which goods or items can be assembled, stacked, stored, packaged, handled, transported, and/or moved, such as with the aid of a forklift or pallet jack, as a unit load. Typically, but not always, the pallet is rigid and forms a horizontal base upon which the items rest. Goods, shipping containers, and other items are often placed on a pallet secured with strapping, stretch wrap, and/or shrink wrap. Often, but not always, the pallet is equipped with a superstructure. In one form, the pallet includes structures that support goods in a stable fashion while being lifted by a forklift, pallet jack, front loader, and/or other lifting devices. In particular, pallets typically include a top deck upon which items are stacked, a bottom deck that rests on the ground, and a spacer structure positioned between the top and bottom decks to receive the forks of the forklift or pallet jack. However, the pallets can be configured differently. For example, the term pallet is used in a broader sense to include skids that have no bottom deck. One or more components of the pallet, or even the entire pallet, can be integrally formed together to form a single unit. By way of non-limiting examples, these pallets can include stringer, block, perimeter, skid, solid deck, multiple deck board, panel-deck, slave, double-deck (or face), single-way entry, two-way entry, four-way entry, flush, single-wing, double-wing, expendable, limited-use, multiple-use, returnable, recycled, heat treated, reversible, non-reversible, and/or warehouse type pallets.

"Processor" generally refers to one or more electronic components configured to operate as a single unit configured or programmed to process input to generate an output. Alternatively, when of a multi-component form, a processor may have one or more components located remotely relative to the others. One or more components of each processor may be of the electronic variety defining digital circuitry, analog circuitry, or both. In one example, each processor is of a conventional, integrated circuit microprocessor arrangement, such as one or more PENTIUM, i3, i5 or i7 processors supplied by INTEL Corporation of 2200 Mission College Boulevard, Santa Clara, Calif. 95052, USA. In another example, the processor uses a Reduced Instruction Set Computing (RISC) architecture, such as an Advanced RISC Machine (ARM) type processor developed and licensed by ARM Holdings of Cambridge, United Kingdom. In still yet other examples, the processor can include a Central Processing Unit (CPU) and/or an Accelerated Processing Unit (APU), such as those using a K8, K10, Bulldozer, Bobcat, Jaguar, and Zen series architectures, supplied by Advanced Micro Devices, Inc. (AMD) of Santa Clara, Calif.

Another example of a processor is an Application-Specific Integrated Circuit (ASIC). An ASIC is an Integrated Circuit (IC) customized to perform a specific series of logical operations for controlling the computer to perform specific tasks or functions. An ASIC is an example of a processor for a special purpose computer, rather than a processor configured for general-purpose use. An application-specific integrated circuit generally is not reprogrammable to perform other functions and may be programmed once when it is manufactured.

In another example, a processor may be of the "field programmable" type. Such processors may be programmed multiple times "in the field" to perform various specialized or general functions after they are manufactured. A field-programmable processor may include a Field-Programmable Gate Array (FPGA) in an integrated circuit in the processor. FPGA may be programmed to perform a specific series of instructions which may be retained in nonvolatile memory cells in the FPGA. The FPGA may be configured by a customer or a designer using a Hardware Description Language (HDL). An FPGA may be reprogrammed using another computer to reconfigure the FPGA to implement a new set of commands or operating instructions. Such an operation may be executed in any suitable means such as by a firmware upgrade to the processor circuitry.

Just as the concept of a computer is not limited to a single physical device in a single location, so also the concept of a "processor" is not limited to a single physical logic circuit or package of circuits but includes one or more such circuits or circuit packages possibly contained within or across multiple computers in numerous physical locations. In a virtual computing environment, an unknown number of physical processors may be actively processing data, and the unknown number may automatically change over time as well.

The concept of a "processor" includes a device configured or programmed to make threshold comparisons, rules comparisons, calculations, or perform logical operations applying a rule to data yielding a logical result (e.g. "true" or "false"). Processing activities may occur in multiple single processors on separate servers, on multiple processors in a single server with separate processors, or on multiple processors physically remote from one another in separate computing devices.

"Safety Command" generally refers to a request for an action to be performed that prevents imminent harm or damage to a human, a piece of equipment, and/or a structure. The safety command can be communicated in a number of forms such as in verbal, written, symbolic, and/or electronic forms. Some non-limiting examples, of safety commands include the words "stop", "halt", "turn", "back up", "reverse", or "slow down" to name just a few.

"Satellite navigation" generally refers to a system that uses satellites to provide geo-spatial positioning data. In one example, the system may include a receiver that interacts with satellites using electromagnetic radiation. The timing of the transmission of the signal from the receiver to the satellites allows calculation of the position of the receiver using triangulation. Some of examples of satellite navigation systems include global positioning systems such as GPS and GLONASS as well as global positioning systems under development such as Galileo. A satellite navigation system may also be a regional positioning system such as BeiDou, NAVIC, and QZSS.

"Sensor" generally refers to an object whose purpose is to detect events and/or changes in the environment of the sensor, and then provide a corresponding output. Sensors include transducers that provide various types of output, such as electrical and/or optical signals. By way of nonlimiting examples, the sensors can include pressure sensors, ultrasonic sensors, humidity sensors, gas sensors, motion sensors, acceleration sensors, displacement sensors, force sensors, optical sensors, and/or electromagnetic sensors. In some examples, the sensors include barcode readers, RFID readers, and/or vision systems.

"Substantially" generally refers to the degree by which a quantitative representation may vary from a stated reference without resulting in an essential change of the basic function of the subject matter at issue. The term "substantially" is utilized herein to represent the inherent degree of uncertainty that may be attributed to any quantitative comparison, value, measurement, and/or other representation.

"Transceiver" generally refers to a device that includes both a transmitter and a receiver that share common circuitry and/or a single housing. Transceivers are typically, but not always, designed to transmit and receive electronic signals, such as analog and/or digital radio signals.

"Transmit" generally refers to causing something to be transferred, communicated, conveyed, relayed, dispatched, or forwarded. The concept may or may not include the act of conveying something from a transmitting entity to a receiving entity. For example, a transmission may be received without knowledge as to who or what transmitted it. Likewise the transmission may be sent with or without knowledge of who or what is receiving it. To "transmit" may include, but is not limited to, the act of sending or broadcasting electromagnetic energy at any suitable frequency in the electromagnetic spectrum. Transmissions may include digital signals which may define various types of binary data such as datagrams, packets and the like. A transmission may also include analog signals.

"Warehouse Management System" or "WMS" generally refers to a computer system and associated software that allow organizations to control and administer warehouse operations from the time goods or materials enter a warehouse, manufacturing plant, storage lot, and/or other inventory facility until the goods or materials move out of the facility. Operations managed by a WMS include, but are not limited to, inventory management, picking processes and/or auditing.

The term "or" is inclusive, meaning "and/or".

It should be noted that the singular forms "a," "an," "the," and the like as used in the description and/or the claims include the plural forms unless expressly discussed otherwise. For example, if the specification and/or claims refer to "a device" or "the device", it includes one or more of such devices.

It should be noted that directional terms, such as "up," "down," "top," "bottom," "lateral," "longitudinal," "radial," "circumferential," "horizontal," "vertical," etc., are used herein solely for the convenience of the reader in order to aid in the reader's understanding of the illustrated embodiments, and it is not the intent that the use of these directional terms in any manner limit the described, illustrated, and/or claimed features to a specific direction and/or orientation.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by the following claims are desired to be protected. All publications, patents, and patent applications cited in this specification are herein incorporated by reference as if each individual publication, patent, or patent application were specifically and individually indicated to be incorporated by reference and set forth in its entirety herein.

| Reference Numbers | |
|---|---|
| 100 | AMU system |
| 105 | AMU |
| 110 | base station |
| 115 | lanyard |
| 120 | WMS |
| 125 | network |
| 205 | microphone |
| 210 | controller |
| 215 | memory |
| 220 | GNC system |
| 225 | sensors |
| 230 | I/O device |
| 235 | transceiver |
| 305 | microphone |
| 310 | processor |
| 315 | memory |
| 320 | I/O device |
| 325 | transceiver |
| 405 | microphone |
| 410 | processor |
| 415 | memory |
| 420 | PDS |
| 425 | transceiver |
| 430 | ESS |
| 435 | strap slot |
| 440 | strap |
| 505 | network interface |
| 510 | processor |
| 515 | memory |
| 520 | I/O device |
| 605 | automated forklift |
| 610 | forks |
| 615 | arrows |
| 620 | individual |
| 625 | verbal instruction |
| 700 | flowchart |
| 705 | stage |
| 710 | stage |
| 715 | stage |
| 720 | stage |
| 725 | stage |
| 730 | stage |
| 805 | first storage location |
| 810 | first pallet |
| 815 | second storage location |
| 820 | second pallet |
| 825 | third storage location |
| 830 | third pallet |
| 835 | initial path |
| 840 | detour path |
| 900 | flowchart |
| 905 | stage |
| 910 | stage |
| 915 | stage |
| 920 | stage |
| 1005 | inner safety zone |
| 1010 | outer safety zone |
| 1015 | arrow |

-continued

| Reference Numbers | |
|---|---|
| 1020 | arrow |
| 1025 | arrow |
| 1100 | flowchart |
| 1105 | stage |
| 1110 | stage |
| 1115 | stage |
| 1120 | stage |
| 1125 | stage |

What is claimed is:

1. A system, comprising:
a warehouse management system (WMS);
an autonomous mobile unit (AMU) that is responsive to one or more voice commands, wherein the AMU includes
a controller,
a microphone operatively coupled to the controller, wherein the microphone is configured to receive the voice commands,
wherein the controller is configured to differentiate between the voice commands that are safety control commands and non-safety control commands,
wherein the safety control commands are requests for an action to be performed by the AMU that prevent imminent harm or damage,
wherein the non-safety control commands are requests not concerning the prevention of imminent harm or damage,
wherein the controller is configured to process the safety control commands locally in the AMU,
wherein the controller is configured to cause the AMU to act in response to the safety control commands,
a transceiver operatively coupled to the controller, and
wherein the controller is configured to transmit via the transceiver the non-safety control commands to the WMS:
wherein the WMS is configured to decode the non-safety control commands;
wherein the WMS is configured to send instructions concerning the non-safety control commands to the transceiver of the AMU:
wherein the AMU is configured to perform a first material handling task,
wherein the voice commands include a second task voice command providing instructions to perform a second material handling task,
wherein the AMU is configured to interrupt performance of the first material handling task in favor of the second material handling task; and
wherein the AMU is configured to resume the first material handling task upon completion of the second material handling task.

2. The system of claim 1, wherein the safety control commands are configured to stop the AMU.

3. The system of claim 1, wherein the controller includes a circuit board integrated with the microphone.

4. The system of claim 1, wherein the voice commands include requests for information.

5. The system of claim 1, wherein the voice commands include system control commands for controlling functions of the AMU.

6. The system of claim 5, wherein the system control commands control movement of the AMU.

7. The system of claim 1, wherein the AMU includes an Automated Guided Vehicle (AGV).

8. The system of claim 1, further comprising:
a base station with a microphone for receiving the voice commands to control the AMU.

9. The system of claim 1, further comprising:
a lanyard with a microphone for receiving the voice commands to control the AMU.

10. The system of claim 9, wherein the lanyard includes a tracking device for location tracking.

11. The system of claim 10, wherein the AMU is configured to perform a safety action in the presence of the lanyard.

12. A method, comprising:
operating an autonomous mobile unit (AMU), wherein the AMU includes a controller, a microphone operatively coupled to the controller, and a transceiver operatively coupled to the controller;
receiving voice commands with the microphone;
processing the voice commands locally with the controller of the AMU;
determining with the controller that some of the voice commands are safety control commands, wherein the safety control commands are requests for an action to be performed by the AMU that prevent imminent harm or damage;
sending a command from the controller for the AMU to perform a safety action to avoid the harm or damage;
determining with the controller that some of the voice commands are non-safety control commands, wherein the non-safety control commands are requests not concerning the prevention imminent harm or damage;
transmitting via the transceiver the non-safety control commands to a warehouse management system (WMS);
decoding the non-safety control commands with the WMS;
transmitting instructions concerning the non-safety control commands from the WMS to the transceiver of the AMU in response to the decoding:
initiating performance of a first material handling task with the AMU;
interrupting the performance of the first material handling task with the AMU upon the receiving the voice commands;
performing a second material handling task with the AMU in response to the receiving the voice commands; and
resuming the performance of the first material handling task with the AMU after the performing the second material handling task.

13. The method of claim 12, further comprising: stopping the AMU in response to the safety control commands.

14. The method of claim 12, wherein the controller includes a circuit board integrated with the microphone.

15. The method of claim 12, wherein the voice commands include requests for information.

16. The method of claim 12, wherein the voice commands include system control commands for controlling functions of the AMU.

17. The method of claim 16, further comprising:
controlling movement of the AMU based on the system control commands.

18. The method of claim 12, wherein the AMU includes an Automated Guided Vehicle (AGV).

19. The method of claim 12, further comprising:
receiving the voice commands with a microphone of a base station; and controlling the AMU with the voice commands from the base station.

20. The method of claim 12, further comprising:
receiving the voice commands with a microphone of a lanyard; and
controlling the AMU based on the voice commands from the lanyard.

21. The method of claim 20, further comprising:
tracking location of an individual with a Position Detection System (PDS) of the lanyard.

22. The method of claim 21, further comprising:
performing a safety action with the AMU in the presence of the lanyard.

* * * * *

UNITED STATES PATENT AND TRADEMARK OFFICE
CERTIFICATE OF CORRECTION

| | |
|---|---|
| PATENT NO. | : 11,537,119 B2 |
| APPLICATION NO. | : 15/929257 |
| DATED | : December 27, 2022 |
| INVENTOR(S) | : Bastian, II et al. |

Page 1 of 1

It is certified that error appears in the above-identified patent and that said Letters Patent is hereby corrected as shown below:

In the Claims

Column 23, Claim 1, Line 40, replace "WMS:" with --WMS;--

Column 23, Claim 1, Line 45, replace "AMU:" with --AMU;--

Column 24, Claim 12, Line 40, replace "decoding:" with --decoding;--

Signed and Sealed this
Twenty-first Day of February, 2023

*Katherine Kelly Vidal*

Katherine Kelly Vidal
*Director of the United States Patent and Trademark Office*